United States Patent [19]

Dickinson

[11] Patent Number: 4,593,202
[45] Date of Patent: Jun. 3, 1986

[54] COMBINATION OF SUPERCRITICAL WET COMBUSTION AND COMPRESSED AIR ENERGY STORAGE

[75] Inventor: Norman L. Dickinson, Monte Sereno, Calif.

[73] Assignee: DIPAC Associates, Monte Sereno, Calif.

[21] Appl. No.: 488,198

[22] Filed: Apr. 25, 1983

Related U.S. Application Data

[63] Continuation-in-part of Ser. No. 261,143, May 6, 1981, Pat. No. 4,380,960.

[51] Int. Cl.$^4$ .............................................. F01K 27/00
[52] U.S. Cl. ...................................... 290/54; 60/652; 290/43
[58] Field of Search ...................... 290/1 R, 2, 43, 54; 60/652, 659, 727, 39.464

[56] References Cited

U.S. PATENT DOCUMENTS

| | | |
|---|---|---|
| 3,859,795 | 1/1975 | Frutschi .............................. 60/652 |
| 4,158,145 | 6/1979 | Kartsounes et al. ............... 60/652 |
| 4,224,798 | 9/1980 | Brinkerhoff ........................ 60/652 |
| 4,237,692 | 12/1980 | Ahrens et al. .................... 60/727 |
| 4,275,310 | 6/1981 | Summers et al. ................. 290/1 R |
| 4,389,847 | 6/1983 | Kehlhofer .......................... 60/652 X |
| 4,403,477 | 9/1983 | Schwarzenbach ................. 60/727 |

FOREIGN PATENT DOCUMENTS

| | | | |
|---|---|---|---|
| 0093928 | 7/1980 | Japan ................................. 60/727 |
| 2000229 | 1/1979 | United Kingdom ................ 60/652 |

Primary Examiner—William M. Shoop, Jr.
Assistant Examiner—W. E. Duncanson, Jr.

[57] ABSTRACT

A fuel efficient combination of pressurized combustion and compressed air energy storage in which combustion air compressors have excess capacity which is utilized, during off-peak periods, to charge an underground storage cavern. Air withdrawn from the cavern during peak periods is utilized as combustion air, freeing the turbines which drove the air compressors during the off-peak period to power generators producing peak load electricity.

12 Claims, 3 Drawing Figures

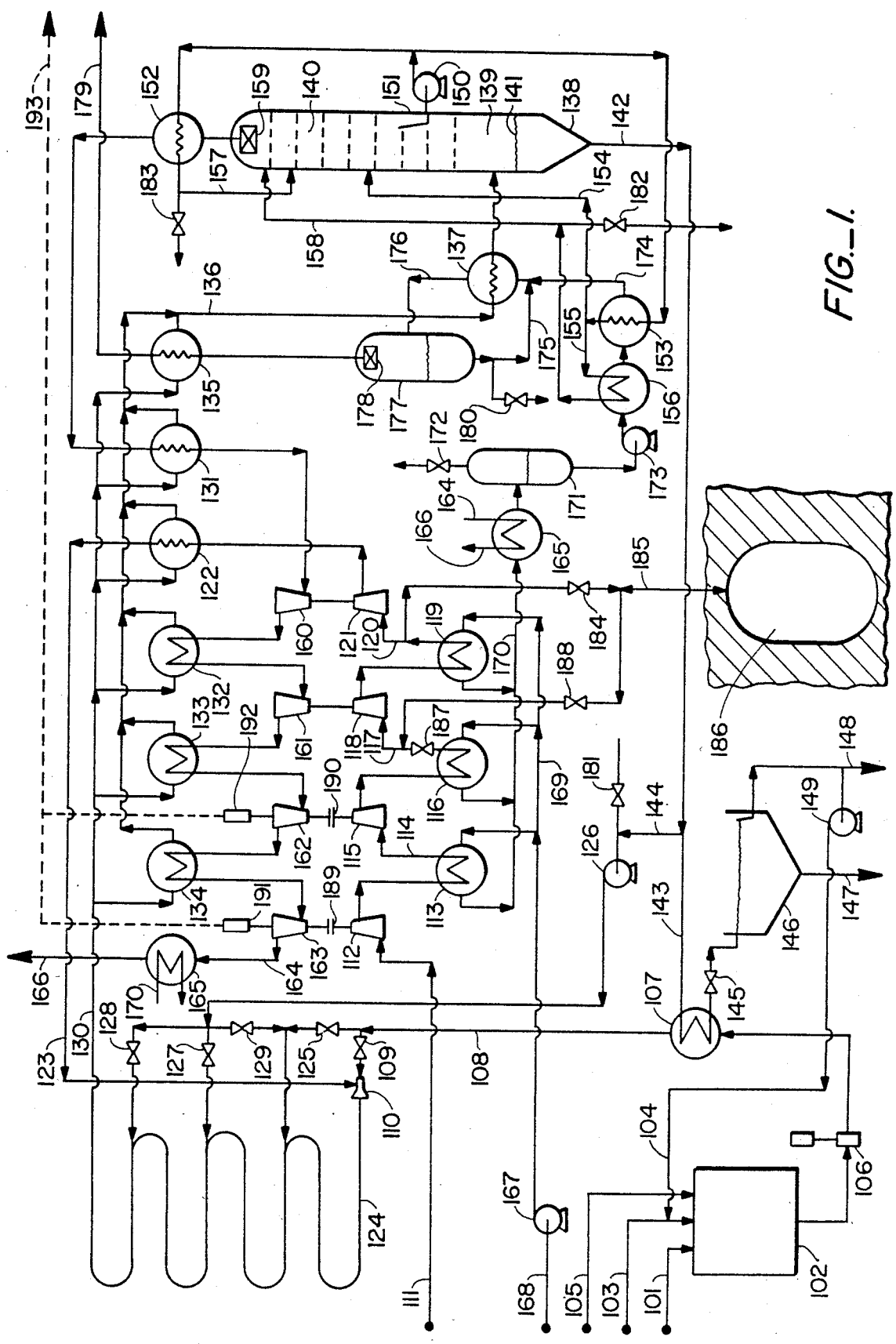
FIG._1.

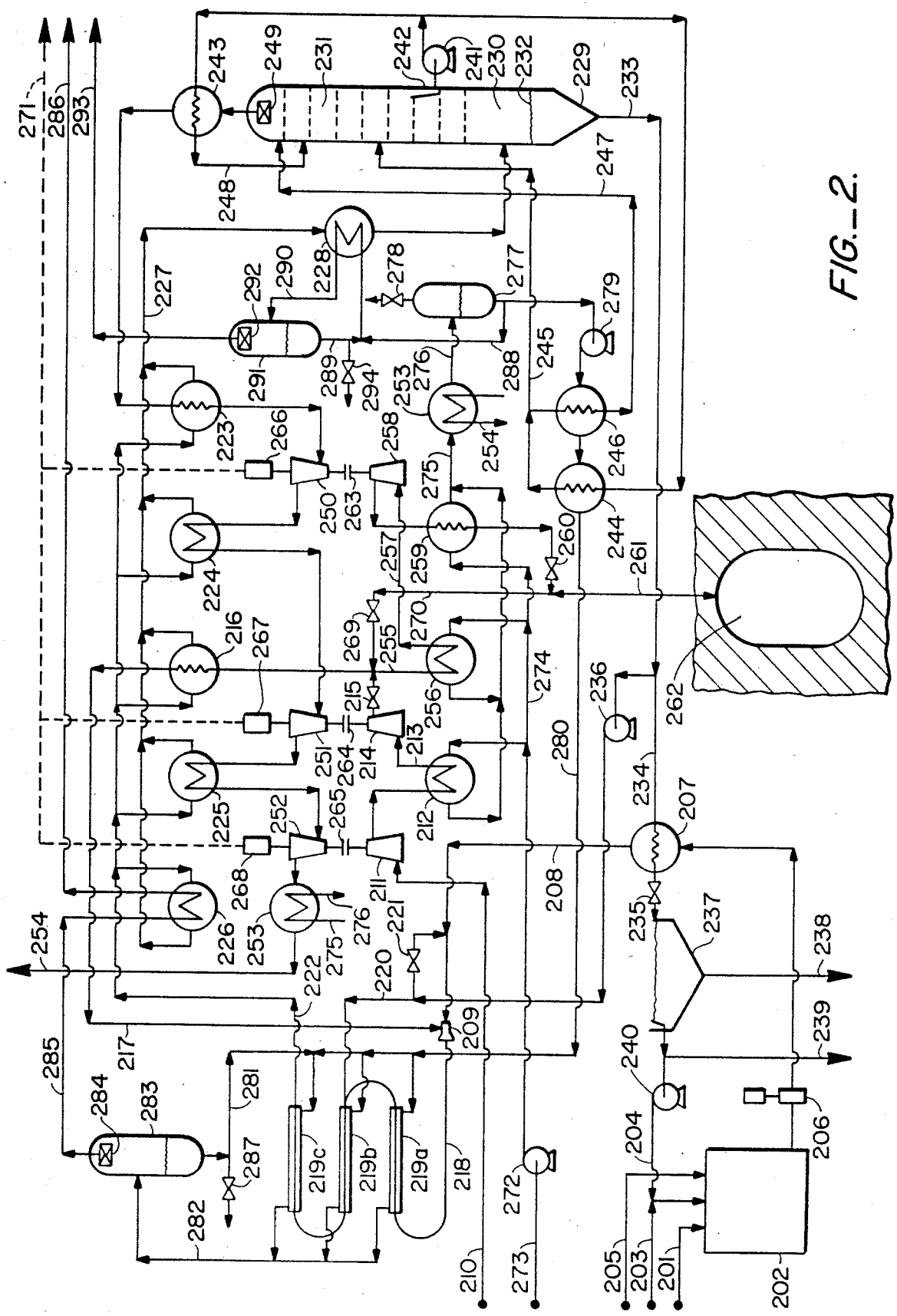
FIG._2.

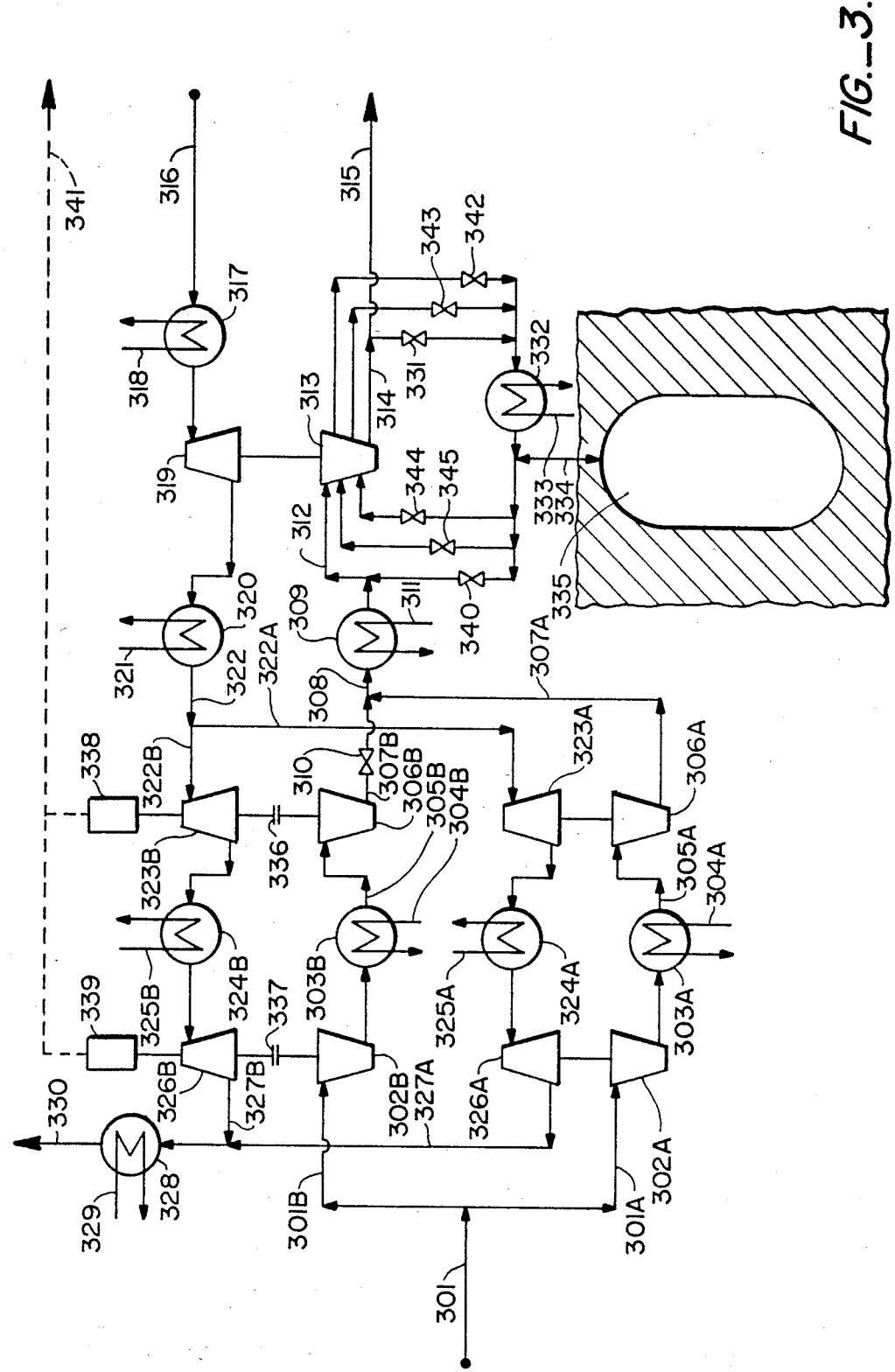
FIG._3.

COMBINATION OF SUPERCRITICAL WET COMBUSTION AND COMPRESSED AIR ENERGY STORAGE

CROSS-REFERENCE TO RELATED APPLICATION

This application is a continuation-in-part of application Ser. No. 261,143, filed May 6, 1981 (now U.S. Pat. No. 4,380,960).

BACKGROUND OF THE INVENTION

This invention concerns the generation of electricity from coal and other fuels which are relatively inexpensive because of their contents of sulfur, ash and/or moisture, and particularly the economical supply of incremental amounts of electricity during recurring periods of peak demand, utilizing a facility which stores compressed air, or other gaseous mixture, during off-peak periods.

It is well known to transfer heat of combustion of a fuel to water boiling under pressure so as to produce steam which is subsequently expanded through a turbine which produces mechanical energy which, in turn, is converted to electricity by a rotating generator or alternator. It is usual to utilize some of the combustion heat to increase the steam temperature before expansion (superheat) and common to similarly reheat it at one or more intermediate stages in the expansion. Because steam can be recondensed to water having a low vapor pressure (compared with atmospheric pressure) it is common practice to augment the energy output of the expansion by exhausting to a sub-atmospheric pressure (vacuum).

Several other methods of obtaining mechanical energy for conversion to electricity are in common use, including hydraulic and gas turbines and internal combustion engines. In general, a long-term steady demand for electricity (base load) justifies a large investment in reliable, efficient generating capacity.

It is characteristic of most large electrical supply and distribution systems, particularly those serving diversified consumers, that there is an appreciable daily, and often seasonal, variation in the total amount required. It is costly and wasteful to provide for the short term peaks in demand (which is sometimes called "peak shaving") with the same expensive efficient generating facilities justified for the base load demand.

Electric utilities and their suppliers have devised numerous alternative methods of generating supplemental peak load electricity at less incremental expense than would be required to enlarge base load capacity. Among these are older, less efficient boilers and turbines, diesel and gas turbine powered generators and pumped hydroelectric, using an elevated water reservoir which is filled by electric powered water pumps during off-peak periods.

Somewhat analogous to pumped hydroelectric is a relatively new method known as Compressed Air Energy Storage (CAES). Instead of pumping water, surplus off-peak electricity goes to a motof-generator (operating in motor mode), driving compressors which deliver atmospheric air into a storage facility where it accumulates under pressure until needed for peak shaving. Then it is heated by direct firing of oil or gas and expanded through turbines which furnish mechanical energy to the motor-generator (in generator mode), which feeds the necessary supplemental electricity into the distribution grid for the duration of peak demand.

Sites suitable for sufficiently large elevated reservoirs are relatively scarce, limiting the opportunities to utilize the pumped hydroelectric method. On the other hand, compressed air can be stored in caverns hollowed out of hard rock, solution mined cavities in salt domes and even certain aquifers (porous underground formations normally containing water). One or another of these options which, for convenience, I will lump together as storage caverns, are available to most utilities. Although operating experience with the CAES method is so far limited to one installation in West Germany, another was under contract in Illinois. A spokesman has predicted that CAES could account for half of the industry's energy storage by the year 2020.

There is, as yet, little experience to establish the feasible and economic storage pressure range of future CAES facilities. That at Huntorf, W. Germany is charged at 1000 pounds per square inch (psi) whereas that in Illinois was to be charged at 815 psi, according to published reports. It seems reasonable to expect that the range may broaden with future experience to perhaps 500 to 1500 psi. The salt cavern at Huntorf has a constant capacity and therefore varies in pressure during its operating cycle. The hard rock cavern in Illinois, on the other hand, was to be hydraulically compensated so as to store air at essentially constant pressure.

In addition to the storage cavern, a CAES facility requires an expensive multi-stage air compressor, a multi-stage gas turbine with combustion chambers, a motor-generator, compressor intercoolers and aftercooler (or heat storage), fuel, cooling water and other auxiliary systems. Besides capital, overhead and personnel costs CAES, as heretofore known, has a low energy efficiency. Although sometime described as surplus, the electricity used to charge the cavern consumed about 3 times its energy equivalent in fuel. Before it becomes electricity again it goes through a chain of conversions: to mechanical energy, to pressure energy and waste heat, to heated air, to mechanical energy and, finally, electricity. Each step compounds the inefficiency—to an overall efficiency level which varies from case to case but is unlikely to be much about 10 percent.

Copending Ser. No. 261,143. now U.S. Pat. No. 4,380,960, (the parent case) describes several embodiments of a continuous supercritical wet combustion process which is capable of recovering the dry heating values of wet, high ash or sulfurous fuels without polluting the atmosphere. Alkali and elevated pressures of oxygen and water vapor are employed to convert carbon at relatively low temperatures, at which there is virtually no production of sulfur or nitrogen oxides.

While, as a minimum, water vapor pressures may be as low as 3 atmospheres, or about 45 psi, system pressures with sulfurous fuels are usually about 100 psi and may be as high as 5000 psi. Generally, multi-stage compressors are employed to charge combustion air, driven by multi-stage turbines which recover pressure energy from flue gas. These turbines and compressors are similar to those which comprise main components of a CAES facility.

U.S. Pat. No. 4,377,066 describes a continuous supercritical wet combustion process similar to that of the parent case, except that combustion reactions take place in a bed of fluidized solids, which may also be combined advantageously with a CAES facility.

Individual fans of axial flow compressors and individual wheels of centrifugal compressors, together with their companion fixed elements, are sometimes called "stages". A number of these "stages" are frequently arranged in series within a single casing and it is not unusual to arrange two or more such casings in series. It is normally necessary or economical to cool the partially compressed gas between cases, to avoid excessive temperatures and to minimize horsepower consumption in the succeeding case. For purposes of this description, one of a series (or train) of compressor, or turbine, cases (each containing a plurality of fans or wheels) will be referred to as a stage.

The number of fans or wheels per case varies between manufacturers and may also be influenced by the economics of a particular installation. Usually, a case, or stage in my terminology, will deliver a compression ratio in the range of 4 to 7. Gas turbine engines usually have only one such stage. The known pressurized fluidized bed combustions (PFBC's) may employ 1 to 3 stages whereas the supercritical wet combustion processes of the parent case and U.S. Pat. No. 4,377,066 may utilize 1 to 5 stages, usually 2 to 4.

Experience with air storage caverns is so far limited to compressor trains of 3 stages but it is quite possible that future installations may extend the range to 2 to 4 stages.

SUMMARY OF THE INVENTION

An alkalized aqueous slurry of a carbonaceous fuel is pumped, preheated and charged to the inlet of an elongated pressurized combustion reactor. Air is compressed, preheated and mixed with the preheated fuel slurry in the inlet zone, vaporizing the slurry water. Fuel particles burn as they move through the reactor, entrained in the steam-air mixture. Temperature is controlled at a relatively low level by injecting water, by transferring heat from the combusting mixture or by a combination of both methods.

Recovery of useful heat from combustion products, as to generate high pressure superheated steam to drive a base load turbogenerator, cools and dehydrates the flue gas, which is reheated and expanded through turbines which drive the air compressors.

Air compressors are designed to compress somewhat more air than charged to the reactor during off-peak periods. The excess is diverted to a storage cavern, increasing either its pressure or its effective storage volume. During peaking periods, compressed air is withdrawn from the cavern and sent to the reactor, replacing all or part of that previously being compressed. The turbines which drove compressor stages not needed during this period now have excess mechanical energy to power peaking generators which deliver the supplemental electricity to meet peak demand.

Besides satisfying the low energy demand of off-peak periods and the high demand of peak periods, the process of my invention adapts to the changing demands between these extremes. Upon conclusion of an off-peak period, during a pre-peak transition, compressed air previously sent to the cavern is progressively diverted to the reactor and, conversely, upon conclusion of a peak period, during a post-peak transition, it is progressively restored to the off-peak disposition. Concurrently, fuel slurry flow to the reactor is increased or decreased so as to maintain the proper air-fuel ratio.

An object of the invention is to provide means of generating supplemental peak load electricity at lower capital cost than possible with known base load-peak load combinations. Another object is to increase the energy efficiency of Compressed Air Energy Storage. A further object is to provide means by which peak as well as base load electricity may be generated economically from solid fuels, including those high in sulfur, ash and/or moisture. Further objects and advantages will become apparent from a consideration of the drawings and descriptions thereof.

BRIEF DESCRIPTION OF THE DRAWINGS

FIG. 1 is a schematic elevational diagram of an embodiment of the invention in which combustion pressure is higher than air storage pressure.

FIG. 2 is a schematic elevational diagram of an embodiment of the invention in which combustion pressure is lower than air storage pressure.

FIG. 3 is a schematic elevational diagram of the air compression, flue gas expansion and peak load generating section of an embodiment of the invention in which combustion and air storage charging pressures are approximately the same, and with first and second stage turbocompressors divided into two parallel trains.

DESCRIPTION OF PREFERRED EMBODIMENTS

With reference to FIG. 1, solid fuel from a suitable source is supplied through a conduit 101 to a conventional grinding and slurrying system 102 in which it is mixed with water coming from a suitable storage facility through a line 103 and recycled solution entering by means of a line 104. Powdered, dissolved or slurried alkali is added to the mixture via a conduit 105. A fuel slurry charge pump 106 draws the resulting alkalized slurry from the system 102 and provides sufficient pressure to cause it to flow through a slurry preheat exchanger 107 and via a line 108 and a control valve 109 to an air-fuel slurry mixer 110.

Atmospheric air is filtered in a conventional manner (not shown) to protect the apparatus from airborne solids and conducted through a conduit 111 to the suction of a first stage air compressor 112, which delivers it hot and at an elevated pressure to a first stage intercooler 113.

Atmospheric air contains a variable amount of water vapor (humidity). Most of the water vapor carried by the air drawn into the apparatus condenses to liquid water in the intercooler 113 and is discharged with the cooled air into a line 114. This water is separated from the air in a second stage compressor suction drum and mist extractor (not shown) positioned in the line 114 and removed from the apparatus.

From the line 114 the first stage compressed air flows to the suction of a second stage air compressor 115 which delivers it hot and at a further increased pressure to a second stage intercooler 116. A small amount of liquid water condenses also in the intercooler 116 and is discharged with the cooled air into a line 117. This water is separate from the air in a third stage compressor suction drum and mist extractor (not shown), positioned in the line 117, and removed from the apparatus.

From the line 117 the second stage compressed air flows to the suction of a third stage air compressor 118 which delivers it hot and at a further increased pressure to a third stage intercooler 119. Although the cooled air leaving the intercooler 119 into a line 120 contains only traces of liquid water a fourth stage compressor suction drum and mist extractor (not shown) is positioned in the line 120.

From the line 120 the third stage compressed air flows to the suction of a fourth stage air compressor 121 which delivers it hot and at a pressure somewhat above combustion pressure to an air preheat exchanger 122 in which it is further heated by indirect exchange with combustion products. The preheated air is then delivered by a line 123 to the air-fuel slurry mixer 110.

The amount of fuel slurry flowing through the control valve 109 is preferably regulated so that the preheated air is able to completely vaporize the slurry water and raise the temperature of the mixture leaving the mixer 110 to a level at which combustion of fuel particles is initiated as it enters a reactor 124. Heat of combustion further increases the temperature of the steam-air mixture, in which particles of fuel and alkali are entrained, as it moves through the reactor 124.

When the temperature of the mixture has reached a satisfactory level, preferably sufficient to vaporize the water in the remainder of the fuel slurry, it is injected into the reactor through a control valve 125. Although heat absorbed in vaporizing this second portion of slurry water causes a brief dip in reactor temperature, liberation of combustion heat starts it increasing again as the combined fluid continues to flow through the reactor 124.

An ash slurry recycle pump 126 delivers hot recycle water (internal recycle), containing suspended ash and spent alkali particles, to injection points at intervals along the length of the reactor, to control combustion temperature within predetermined limits. This provision is illustrated by the connections via control valves 127 and 128. A portion of the internal recycle may also be diverted through a control valve 129 to dilute that part of the fuel slurry which reaches the reactor through the valve 125.

Hot combustion products leave the reactor 124 through a line 130, flowing to a first stage flue gas reheat exchanger 131, a second stage flue gas reheat exchanger 132, a third stage flue gas reheat exchanger 133, a fourth stage flue gas reheat exchanger 134, a steam superheat exchanger 135 and the air preheat exchanger 122. In these six exchangers the hot combustion products serve as heating medium for flue gas at four different pressure levels, saturated high pressure steam and compressed air. Although shown in parallel, with respect to combustion products, some of these exchangers may alternatively be arranged in series.

Partially cooled combustion products from the exchangers 131, 132, 133, 134, 135 and 122 recombine in a manifold 136 which conveys them to a boiler 137 in which part of their remaining sensible heat, and the latent heat of part of their water vapor content are transferred to boiling feedwater. Gases remaining uncondensed after passing through the boiler 137, to which I shall refer as wet flue gas, together with the condensed water and particles of ash and spent alkali, flow to a flue gas dehydrator 138, a cylindrical vessel containing an open separating zone 139 in its lower section and a rectification zone 140, comprising a series of vapor-liquid contacting elements, such as bubble or perforated trays, in its upper section.

In the separating zone 139 gravity causes the water carrying the solid particles to separate and collect in the bottom forming, along with water flowing downward from the lowest contacting element, an ash slurry level 141. This level is held within the proper operating range by withdrawing the net ash slurry production through lines 142 and 143, and the slurry preheat exchanger 107, under control of a let-down valve 145. The ash slurry recycle pump 126, previously referred to, also takes suction from the bottom of the flue gas dehydrator 138 through the line 142 and a line 144.

Cooled and depressured net ash slurry enters an ash settler 146 in which gravity causes the solid particles to concentrate in a conical bottom section, from which they are withdrawn from the apparatus through a line 147. The aqueous liquid in the upper part of the settler 146, from which most of the solids have been separated, flows to a point of division between a portion which is purged from the apparatus through a line 148, and a portion, known as external recycle, which is returned by a solution pump 149 through the line 104 to the grinding and slurrying system 102.

Referring again to the flue gas dehydrator 138, wet flue gas separated from ash slurry in the separating zone 139 rises through the rectification zone 140, in countercurrent contact with a descending cascade of cooled water circulated by a circulating reflux pump 150. This multi-stage contact cools the flue gas and condenses from it most of the water vapor it contained when separated from ash slurry. The condensed water flows downward over the lower trays of the rectification zone 140, washing the wet flue gas free of entrainment. It then joins the ash slurry in the bottom of the dehydrator 138.

The pump 150 takes suction from a sump 151 located in the lower section of the rectification zone 140, a few trays above the lowermost contacting element, and delivers hot water, approaching in temperature the wet flue gas rising from the separating zone 139, to a circulating reflux-flue gas exchanger 152 and a secondary circulating reflux-boiler feedwater exchanger 153. Part of the circulating reflux, partially cooled by exchange with feedwater in the exchanger 153, returns to the rectification zone 140 through a line 154 as intermediate reflux. The remainder flows through a line 155 to a primary circulating reflux-boiler feedwater exchanger 156 in which it is sufficiently cooled to be returned to the rectification zone 140 as top reflux. The circulating reflux cooled by exchange with dehydrated flue gas in the exchanger 152 is returned to a tray in the upper part of the rectification zone 140.

Cooled and dehydrated flue gas leaving the top of the rectification zone 140 passes through a mist extractor 159 to free it of entrained water droplets and is then reheated, successively, by hot circulating reflux in the exchanger 152 and by combustion products in the exchanger 131. The reheated flue gas is then expanded through a first stage flue gas turbine 160 which delivers mechanical energy, in the form of shaft horsepower, to the fourth stage air compressor 121.

Having been cooled by giving up energy in the turbine 160, the partially expanded flue gas is reheated by combustion products in the exchanger 132. The reheated flue gas is then expanded a second time through a second stage flue gas turbine 161 which delivers mechanical energy, in the form of shaft horsepower, to the third stage air compressor 118.

Having been cooled by giving up energy in the turbine 161, the further expanded flue gas is reheated by combustion products in the exchanger 133. The reheated flue gas is then expanded a third time through a third stage flue gas turbine 162 which, during off-peak periods, delivers mechanical energy, in the form of shaft horsepower, to the second stage air compressor 115.

Having been cooled by giving up energy in the turbine 162, the further expanded flue gas is reheated by combustion products in the exchanger 134. The reheated flue gas is then expanded a fourth time through a fourth stage flue gas turbine 163 which, during off-peak periods, delivers mechanical energy, in the form of shaft horsepower, to the first stage air compressor 112.

Having been partially cooled by giving up energy in the turbine 163, the fully expanded flue gas, now at a pressure only slightly above atmospheric, flows via a line 164 to an economizer exchanger 165, in which it is further cooled by boiler feedwater before being released, through a suitable vent 166, to the atmosphere.

A low pressure boiler feedwater pump 167 takes suction through a line 168 from a source external to the apparatus and delivers feedwater via a manifold 169 to the first stage compressor intercooler 113, the second stage intercooler 116 and the third stage intercooler 119. Extracting heat from compressed air in these exchangers warms the parallel feedwater streams which recombine in a header 170. The feedwater is then further heated by expanded flue gas in the economizer 165 before entering a feedwater accumulator 171.

The accumulator 171 which may be, in practice, a feedwater deaerator of proprietary design, permits the separation of any gases liberated by the heating of the feedwater, allowing them to be vented through a valve 172. From the accumulator 171 deaerated feedwater flows to the suction of a high pressure boiler feedwater pump 173. The pump 173 delivers the feedwater under sufficient pressure to cause it to flow through the exchangers 156 and 153, in which it receives its final preheat, and a line 174 to the cold side inlet of the boiler 137.

The preheated feedwater joins with recirculated feedwater from a line 175, the combined stream flowing to the boiler 137 in which heat transferred from combustion products converts part of the water to steam. A two-phase water-steam mixture flows from the boiler 137 via a line 176 to a steam drum 177. The difference in density between water in the line 175 and the water-steam mixture in the line 176 sets up a hydraulic driving force which causes water to circulate from the bottom of the drum 177 through the boiler 137 and back to the drum 177.

In the drum 177 steam separates from water and leaves through a mist extractor 178, which purifies it of entrained droplets on its way to the steam superheat exchanger 135 in which it is superheated by hot combustion products before leaving the apparatus through a line 179.

Dissolved solids brought into the apparatus with the cold feedwater tend to accumulate in the water in the steam drum 177 and have to be purged from the steam system through a blowdown valve 180. Blowdown water is suitable for internal recycle or fuel slurry preparation.

In case it is desired to take advantage of the inherent water purification capabilities of the process, impure water may be introduced into the apparatus through the line 103 or a valve 181 opening to the suction of the ash slurry recycle pump 126. A more-or-less equal amount of purified water may then be drawn from the recirculating reflux system as, for example, through a valve 182 or a valve 183. A heat exchanger (not shown) would usually be employed to transfer heat from outgoing purified water to incoming impure water.

During off-peak periods the compressors 112, 115 and 118 compress somewhat more air than needed by the combustion. The excess (after having been cooled in the intercooler 119) is diverted through a valve 184 and a line 185 to an underground compressed air storage cavern 186. The pressure in the cavern 186 begins a charging cycle at about the normal suction pressure of the third stage compressor 118 and ends the cycle a little under the normal discharge pressure of the compressor 118.

As energy demand begins to rise appreciably above the off-peak level, during the pre-peak transition, more of the air discharged by the compressor 118 is directed through the compressor 121 and the air preheat exchanger 122 to the air-fuel slurry mixer 110, and proportionately less to the cavern 186. The rate of fuel slurry charge to the mixer 110 is correspondingly increased. As energy demand continues to rise, the proportion of air delivered to the mixer reaches 100% of that compressed and the cavern charging rate drops to zero.

When the peaking period begins, the valve 184 and a valve 187, in the line 117, are closed and a valve 188, between the cavern 186 and the suction of the compressor 118, is opened. Compressed air flows from the cavern through the line 185 and the valve 188 to the suction of the compressor 118, replacing that previously supplied by the first and second stage compressors 112 and 115. A clutch 189 in the shaft connecting the fourth stage turbine 163 to the first stage compressor 112, and a clutch 190 in the shaft connecting the third stage turbine 162 to the second stage compressor 115, are disengaged. The shaft horsepower developed by the turbines 163 and 162 is now delivered to peaking generators 191 and 192 which convert it to supplemental electricity, which leaves the apparatus through a conduit 193.

At the completion of the peaking period, the valve 188 is closed, the valves 184 and 187 are opened, the clutches 189 and 190 are engaged and the system enters the post-peak transition, during which energy demand declines toward its off-peak level.

This part of the cycle is characterized by a progressive decrease in compressed air to the air-fuel slurry mixer 110 and a corresponding increase to the cavern 186, along with a proportionate decrease in fuel slurry rate, until these rates reach approximately the levels which prevailed at the start of the previous off-peak period. The cycle is then completed and a new one begins.

With reference to FIG. 2, solid fuel from a suitable source is supplied through a conduit 201 to a conventional grinding and slurrying system 202 in which it is mixed with water coming from a suitable storage facility through a line 203 and recycled solution entering by means of a line 204. Powdered, dissolved or slurried alkali is added to the mixture via a conduit 205. A fuel slurry charge pump 206 draws the resulting alkalized slurry from the system 202 and provides sufficient pressure to cause it to flow through a fuel slurry preheat exchanger 207 and via a line 208 to an air-fuel slurry mixer 209.

Atmospheric air is filtered in a conventional manner (not shown) to protect the apparatus from airborne solids and conducted through a conduit 210 to the suction of a first stage air compressor 211, which delivers it hot and at an elevated pressure to a first stage intercooler 212.

Atmospheric air contains a variable amount of water vapor (humidity). Most of the water vapor carried by the air drawn into the apparatus condenses to liquid water in the intercooler 212 and is discharged with the cooled air into a line 213. This water is separated from the air in a second stage compressor suction drum and mist extractor (not shown), positioned in the line 213, and removed from the apparatus.

From the line 213 the first stage compressed air flows to the suction of a second stage air compressor 214 which delivers most of it hot and at a further increased pressure through a valve 215 to an air preheat exchanger 216 in which it is further heated by indirect exchange with combustion products. The preheated air is then delivered by a line 217 to the air-fuel slurry mixer 209.

In the mixer 209 sensible heat of the preheated air causes the water in the preheated fuel slurry to vaporize so that fuel and alkali particles flow to a tubular reactor 218 entrained in a gaseous mixture of air and water vapor. Downstream sections of the reactor 218 are equipped with heat transfer surface, the form illustrated comprising concentric pipes 219a, 219b and 219c surrounding portions of the reactor wall. The amount of heat transfer surface is such that a substantial part of the combustion heat liberated be transferred to feedwater boiling in the annular spaces between the reactor and the concentric pipes 219a, 219b and 219c.

As the entrained fuel particles move through the reactor 218 they burn, oxygen being replaced by carbon dioxide and additional water vapor. Although heat of combustion causes the temperature of the mixture to rise, the increase is moderated by the aforementioned heat transfer. Maximum temperature may be further limited by the injection of recycled ash slurry, the water in which absorbs heat by changing from liquid to vapor phase, at one or more points through connections illustrated by a line 220. Besides aiding control of combustion temperatures, the recycled slurry (internal recycle) increases the partial pressure of water vapor, favorably influencing the oxidation of carbon and sulfur in the fuel.

In addition to being injected into the reactor 218, recycled slurry may be used to dilute the preheated fuel slurry before it is mixed with the preheated air, through a connection controlled by a valve 221.

Hot combustion products leave the reactor 218 through a line 222, flowing to a first stage flue gas reheat exchanger 223, a second stage flue gas reheat exchanger 224, a third stage flue gas reheat exchanger 225, a steam superheat exchanger 226 and the air preheat exchanger 216, in which they serve as heating medium for, respectively, dehydrated flue gas at three pressure levels, high pressure steam and compressed combustion air.

Partially cooled combustion products from the exchangers 223, 224, 225, 226 and 216 recombine in a manifold 227 which conveys them to a boiler 228 in which more of their sensible heat, and the latent heat of part of their water vapor content, are transferred to boiling low pressure feedwater. Gases remaining uncondensed after passing through the boiler 228, to which I shall refer as wet flue gas, together with condensed water and particles of ash and spent alkali, flow to a flue gas dehydrator 229, a cylindrical vessel containing an open separating zone 230 in its lower section and a rectification zone 231, comprising a series of vapor-liquid contacting elements, such as bubble or perforated trays, in its upper section.

In the separating zone 230 gravity causes the water carrying the solid particles to separate and collect in the bottom forming, along with water flowing downward from the lowest of the contacting elements, an ash slurry level 232. This level is held within the proper operating range by withdrawing the net production of ash slurry through lines 233 and 234 and the fuel slurry preheat exchanger 207, under control of a let-down valve 235. An ash slurry recycle pump 236 also takes suction from the bottom of the dehydrator 229 through the line 233, delivering internal recycle to the reactor 218 and, optionally, to the preheated slurry line 208.

Having been reduced in pressure to near atmospheric in the let-down valve 235, cooled net ash slurry enters an ash settler 237 in which gravity causes the solid particles to concentrate in a conical bottom section, from which they are withdrawn from the apparatus through a line 238. The aqueous liquid in the upper part of the settler 237, from which most of the solids have been separated, flows to a point of division between a portion which is purged from the apparatus through a line 239 and a portion, known as external recycle, which is returned by a solution pump 240 to the grinding and slurrying system 202.

Referring again to the flue gas dehydrator 229, wet flue gas separated from ash slurry in the separating zone 230 rises through the rectification zone 231, in countercurrent contact with a descending cascade of cooled water circulated by a circulating reflux pump 241, which takes suction from a sump 242 located in the lower part of the zone. This multi-stage contacting cools the flue gas and condenses from it most of the water vapor it contained when separated from ash slurry. The condensed water flows downward over the lower contacting elements, washing the wet flue gas free of entrainment. It then joins the ash slurry in the bottom of the dehydrator 229.

The pump 241 discharges hot water, approaching in temperature the wet flue gas rising from the separating zone 230, to a circulating reflux-flue gas exchanger 243 and a secondary circulating reflux-boiler feedwater exchanger 244. Part of the circulating reflux, partially cooled by exchange with feedwater in the exchanger 244, returns to the rectification zone 231 through a line 245 as intermediate reflux. The remainder flows to a primary circulating reflux-boiler feedwater exchanger 246 in which it is sufficiently cooled to be returned to the rectification zone through a line 247 as top reflux. The circulating reflux cooled by exchange with dehydrated flue gas in the exchanger 243 is returned to a contacting element in the upper part of the rectification zone 231.

Cooled and dehydrated flue gas leaving the top of the rectification zone 231 passes through a mist extractor 249 to free it of entrained water droplets and is then reheated, successively, by hot circulating reflux in the exchanger 243 and by combustion products in the exchanger 223. The reheated flue gas is then expanded through a first stage flue gas turbine 250 which, during off-peak periods, delivers mechanical energy, in the form of shaft horsepower, to a booster compressor 258.

Having been cooled by giving up energy in the turbine 250, the partially expanded flue gas is reheated by combustion products in the exchanger 224. The reheated flue gas is then expanded a second time through a second stage flue gas turbine 251 which, during off-peak periods, delivers mechanical energy, in the form of shaft horsepower, to the second stage air compressor 214.

Having been cooled by giving up energy in the turbine 251, the further expanded flue gas is reheated by combustion products in the exchanger 225. The reheated flue gas is then expanded a third time through a third stage flue gas turbine 252 which, during off-peak periods, delivers mechanical energy, in the form of shaft horsepower, to the first stage compressor 211.

Having been partially cooled by giving up energy in the turbine 252, the fully expanded flue gas, now at a pressure only slightly above atmospheric, flows to an economizer exchanger 253, in which it is further cooled by low pressure boiler feedwater before being released, through a suitable vent 254, to the atmosphere.

During off-peak periods, the compressors 211 and 214 compress somewhat more air than needed by the combustion. The excess passes via a line 255 through a storage air intercooler 256 and a line 257 which, although the cooled air carries very little condensed water, contains a booster compressor suction drum and mist extractor (not shown). This air then enters the suction of a booster air compressor 258 which delivers it hot and at a pressure slightly higher than maximum storage pressure to an aftercooler 259 in which it is cooled by boiler feedwater to storage temperature. It then passes through a valve 260 and a line 261 to an underground storage cavern 262. At the beginning of a charging (off-peak) cycle the pressure in the cavern 262 is about that of the discharge of the second stage compressor 214. At the end of a charging cycle, this pressure is a little less than the discharge pressure of the booster compressor 258.

As energy demand begins to rise appreciably above the off-peak level, during the pre-peak transition, more of the air discharged by the compressor 214 is directed through the air preheater 216 to the air-fuel slurry mixer 209, and proportionately less to the cavern 262. The rate of fuel slurry charge to the mixer 209 is correspondingly increased. As energy demand continues to rise, the proportion of air delivered to the mixer 209 reaches 100% of that compressed and the cavern charging rate drops to zero.

The shaft connecting the turbine 250 with the compressor 258 contains a clutch 263. The shaft connecting the turbine 251 with the compressor 214 contains a clutch 264. The shaft connecting the turbine 252 with the compressor 211 contains a clutch 265. The turbine 250 is also mechanically connected with a first stage peaking generator 266. The turbine 251 is also mechanically connected with a second stage peaking generator 267. The turbine 252 is also mechanically connected with a third stage peaking generator 268.

When the peaking period begins the valves 215 and 260 are closed and a valve 269, in a line 270 connecting the line 261 and the downstream side of the valve 215, is opened. The clutches 263, 264 and 265 are disengaged. Stored compressed air flows from the cavern 262 through the line 261 and the line 270, which may contain a knock-out drum with mist extractor or filter (not shown) to protect subsequent equipment from solid particles or liquid droplets carried out of the cavern 262. Air delivered by the line 270 now replaces that previously supplied by the compressors 211 and 214. Since this air is cooler than that discharged by the compressor 214, the line 270 may also contain an air reheat exchanger (not shown) using circulating reflux, condensing steam or other available heating medium.

(The aftercooler 259 may also be replaced by a heat storage device which absorbs heat from the air discharged by the compressor 258 during the charging cycle and releases it to the air recovered from the cavern 262 during the peaking period.)

The shaft horsepower developed by the turbines 250, 251 and 252 is now delivered to, respectively, peaking generators 266, 267 and 268 which convert it to supplemental electricity, which leaves the apparatus through a conduit 271.

At the completion of the peaking period, the valve 269 is closed and the valves 215 and 260 are opened, the clutches 263, 264 and 265 are engaged and the system enters the post-peak transition, during which energy demand declines toward its off-peak level.

This part of the cycle is characterized by a progressive decrease in compressed air to the air-fuel slurry mixer 209 and a corresponding increase to the cavern 262, along with a proportionate decrease in fuel slurry rate, until these rates reach approximately the levels which prevailed at the start of the previous off-peak period. The cycle is then completed and a new one begins.

A low pressure boiler feedwater pump 272 takes suction through a line 273 from a source external to the apparatus and delivers feedwater via a manifold 274 to the first stage intercooler 212, the storage air intercooler 256 and the aftercooler 259. Extracting heat from compressed air in these coolers warms the parallel feedwater streams which recombine in a header 275. The feedwater is then further heated by expanded flue gas in the economizer 253 and flows through a line 276 to a feedwater accumulator 277.

The accumulator 277 which may be, in practice, a feedwater deaerator of proprietary design, permits the separation of any gases liberated by the heating of the feedwater, allowing them to be vented through a valve 278. From the accumulator 277 deaerated feedwater flows to the suction of a high pressure boiler feedwater pump 279, which delivers it under sufficient pressure to cause it to flow through the exchangers 246 and 244, in which it receives its final preheat, and a line 280 to the reactor concentric pipes 219a, 219b and 219c.

Before entering the concentric pipes, which operate in parallel with respect to feedwater and steam, the preheated feedwater joins with recirculated feedwater from a line 281. In the concentric pipes heat transferred from reactor contents coverts part of the combined feedwater to steam. A two-phase water-steam mixture leaves the concentric pipes and flows via a line 282 to a high pressure steam drum 283. The difference in density between water in the line 281 and water-steam mixture in the line 282 sets up a hydraulic driving force which causes water to circulate from the bottom of the drum 283 through the concentric pipes and back to the drum 283.

In the drum 283 steam separates from water and leaves through a mist extractor 284, which purifies it of entrained droplets on its way, via a line 285, to the steam superheat exchanger 226 in which it is superheated by hot combustion products before leaving the apparatus through a line 286.

Dissolved solids brought into the apparatus with the cold feedwater tend to accumulate in the water in the drum 283 and have to be purged from the high pressure steam system through a blowdown valve 287. Blowdown water is suitable for make-up to the low pressure steam system, internal recycle or fuel slurry preparation.

The feedwater accumulator 277 also supplies feedwater through a line 288 to the boiler 228. Prior to entering the cold side inlet of the boiler 228 the deaerated feedwater joins with recirculated feedwater from a line 289. Transfer of heat from combustion products in the boiler 228 converts part of the combined feedwater to steam resulting in a two-phase water-steam mixture which flows through a line 290 to a low pressure steam drum 291. The difference in density between water in the line 289 and water-steam mixture in the line 290 sets up a hydraulic driving force which causes water to circulate from the bottom of the drum 291 through the boiler 228 and back to the drum 291.

In the drum 291 steam separates from water and leaves through a mist extractor 292, which purifies it of entrained droplets before it leaves the apparatus by means of a line 293.

Dissolved solids brought into the apparatus with the cold feedwater tend to accumulate in the water in the drum 291 and have to be purged from the low pressure steam system through a blowdown valve 294. Low pressure blowdown water is suitable for fuel slurry preparation.

With reference to FIG. 3, atmospheric air is filtered in a conventional manner (not shown) and drawn through a conduit 301 to a point of division from which a portion flows through a line 301A to the suction of a first stage air compressor 302A, which delivers it hot and at an elevated pressure to a first stage intercooler 303A. In the intercooler 303A the air is cooled by indirect exchange with boiler feedwater, or other cooling medium, delivered by a line 304A.

Similarly, during off-peak periods, the balance of the filtered air flows through a line 301B to the suction of a first stage air compressor 302B, which delivers it hot and at an elevated pressure to a first stage intercooler 303B. In the intercooler 303B the air is cooled by indirect exchange with boiler feedwater, or other cooling medium, delivered by a line 304B.

Atmospheric air contains a variable amount of water vapor (humidity). Most of the water vapor carried by the air drawn into the apparatus condenses to liquid water in the intercoolers 303A and 303B and is discharged with the cooled air into lines 305A and 305B. This water is separated in second stage air compressor suction drums and mist extractors (not shown) positioned in the lines 305A and 305B and removed from the apparatus.

From the line 305A cooled air flows to the suction of a second stage air compressor 306A, which delivers it hot and at a further increased pressure via lines 307A and 308 to a second stage intercooler 309. Similarly, during off-peak periods, cooled air flows from the line 305B to the suction of a second stage air compressor 306B, which delivers it hot and at a further increased pressure via a line 307B, a valve 310 and the line 308 to the second stage intercooler 309. In the intercooler 309 the air compressed by both second stage compressors is cooled by indirect exchange with boiler feedwater, or other cooling medium, delivered by a line 311. A small amount of liquid water condenses also in the intercooler 309 and is separated from the air in a third stage compressor suction drum and mist extractor (not shown), positioned in a line 312.

From the line 312 the combined cooled compressed air flows to the suction of a third stage air compressor 313 which delivers it hot and at a further increased pressure to a line 314 from which the amount required as combustion air flows through a line 315 to a pressurized combustion, such as that illustrated in FIG. 1 or FIG. 2 or those described in the parent case or U.S. Pat. No. 4,377,066.

Clean flue gas (preferably scrubbed) from the pressurized combustion (not shown) returns to the illustrated apparatus through a line 316 and is reheated in a first stage flue gas reheat exchanger 317, hot combustion products or other heating medium being supplied through a line 318. The reheated flue gas is then expanded through a first stage flue gas turbine 319 which delivers mechanical energy, in the form of shaft horsepower, to the third stage air compressor 313.

Having been cooled by giving up energy in the turbine 319, the partially expanded flue gas is reheated in a second stage flue gas reheat exchanger 320, hot combustion products or other heating medium being supplied through a line 321. Reheated flue gas in a line 322 is then divided, a portion flowing through a line 322A to a second stage flue gas turbine 323A. In the turbine 323A that portion of the reheated flue gas is expanded a second time, yielding mechanical energy, in the form of shaft horsepower, which is delivered to the second stage air compressor 306A.

Having been cooled by giving up energy in the turbine 323A, the further expanded flue gas is reheated in a third stage flue gas reheat exchanger 324A, hot combustion products or other heating medium being supplied through a line 325A. The reheated flue gas is then expanded through a third stage flue gas turbine 326A which delivers mechanical energy, in the form of shaft horsepower, to the first stage air compressor 302A.

Having been partially cooled by giving up energy in the turbine 326A, the fully expanded flue gas, now at a pressure only slightly above atmospheric, is exhausted into a line 327A.

During off-peak periods, the remainder of the reheated flue gas in the line 322 flows through a line 322B to a second stage flue gas turbine 323B in which it is expanded a second time yielding mechanical energy, in the form of shaft horsepower, which is delivered to the second stage air compressor 306B.

Having been cooled by giving up energy in the turbine 323B, the further expanded flue gas is reheated in a third stage flue gas reheat exchanger 324B, hot combustion products or other heating medium being supplied through a line 325B. The reheated flue gas is then expanded through a third stage flue gas turbine 326B which delivers mechanical energy, in the form of shaft horsepower, to the first stage air compressor 302B.

Having been partially cooled by giving up energy in the turbine 326B, the fully expanded flue gas, now at a pressure only slightly above atmospheric, is exhausted into a line 327B. Flue gas in the line 327B combines with flue gas in the line 327A and flows to an economizer exchanger 328, in which the combined gas is further cooled by indirect exchange with boiler feedwater, delivered by a line 329, before being released, through a suitable vent 330, to the atmosphere.

During off-peak periods, the combined output of the compressors 302A and 302B, 306A and 306B, and the compressor 313 is somewhat more compressed air than needed by the combustion. The excess passes through open valve 331 to an aftercooler 332 in which it is cooled to storage temperature by indirect exchange with boiler feedwater, or other cooling medium, delivered by a line 333. The cooled compressed air then passes through a line 334 to an underground storage cavern 335. At the beginning of a charging (off-peak) cycle the pressure in the cavern 335 is about that of the discharge of the second stage compressors 306A and 306B. At the end of a charging cycle, this pressure is a little less than the discharge pressure of the third stage compressor 313.

The shaft connecting the turbine 323B with the compressor 306B contains a clutch 336. The shaft connecting the turbine 326B with the compressor 302B contains a clutch 337. The turbine 323B is also mechanically connected with a No. 1 peaking generator 338. The turbine 326B is also mechanically connected with a No. 2 peaking generator 339.

As energy demand begins to rise appreciably above the off-peak level, during the pre-peak transition, more of the air discharged by the compressor 313 is directed through the line 315 to the pressurized combustion not illustrated), and proportionately less to the cavern 335. As energy demand continues to rise, the proportion of air delivered to the combustion reaches 100% of that compressed and the cavern charging rate drops to zero.

When the peaking period begins the valve 331 is closed and a valve 340, in a line connecting the storage cavern 335 and the suction of the third stage compressor 313, opened. The clutches 336 and 337 are disengaged. Stored compressed air flows from the cavern 335, through the line 334 and the valve 340 to the compressor 313, replacing that previously supplied by the compressors 302B and 306B and supplementing that which continues to be delivered by the compressors 302A and 306A.

The shaft horsepower developed by the turbines 323B and 326B is now delivered to the peaking generators 338 and 339 which convert it to supplemental electricity which leaves the apparatus through a conduit 341.

At the completion of the peaking period, the valve 340 is closed, the valve 331 is opened, the clutches 336 and 337 are engaged and the system enters the post-peak transition, during which energy demand declines toward its off-peak level.

This part of the cycle is characterized by a progressive decrease in compressed air to the combustion and a corresponding increase to the cavern 335, until these rates reach approximately the levels which prevailed at the start of the previous off-peak period. The cycle is then completed and a new one begins.

To simplify the illustration of my invention, the functioning of the embodiments of FIGS. 1-3, incl., has been described as though the thermal power station, of which they are a part, comprised a single such pressurized boiler-compressed air cavern combination. Actually, most power stations contain a plurality of boilers. When my invention is employed in a multi-boiler station, base and peak loads may be distributed in various ways. One or more boilers may be designated for base load service and not have peaking generators. One or more others may be designated to handle all of the peaking duty. The cavern (or caverns) may be charged with air from the compressors of any or all of the pressurized boilers but the stored air utilized, during peaks, in only one (or a few) equipped with peaking generators. Thus, the enhanced peaking capabilities of the FIG. 3 embodiment may be realized with only a single compression train, by drawing on stored air provided, at least in part, by compressors of other boilers in the station.

While the compressor 313 may operate in conjunction with storage cavern 335 satisfactorily as previously described, it is possible to conserve energy by equipping it with alternative suction and discharge connections. At the beginning of a charging cycle, while the pressure in the cavern is comparatively low, it is wasteful to compress air to be stored to the full pressure of which the compressor 313 is capable. It is more efficient to bleed the air from a connection located where the internal pressure is only sufficient to charge the cavern 335 during this part of the cycle, as through a valve 342. Further along in the charging cycle the valve 342 would be closed and a valve 343, connecting to a location in the compressor 313 where the internal pressure is at an intermediate level, would be opened. During the final part of the charging cycle the valve 343 would be closed and charging completed through the valve 331, using the full discharge pressure potential of the compressor 313.

Similarly, at the beginning of a peaking cycle, while the pressure in the cavern 335 is comparatively high, it is wasteful to break it down to the normal suction pressure of the compressor 313. It is more efficient to feed it through a connection located where the internal pressure is only enough lower than cavern pressure to maintain flow, as through a valve 344. Further along in the peaking cycle the valve 344 would be closed and a valve 345, connecting to a location of intermediate internal pressure, would be opened. During the final part of the cycle the valve 345 would be closed and cavern discharging completed, using the normal suction connection through the valve 340.

Regardless of the point of entry of stored air it is preferable to protect the compressor 313 by passing the flow through a knock-out drum and mist extractor as described in connection with the line 312.

DESCRIPTION OF THE INVENTION

The storage of energy as compressed air in underground caverns is a comparatively recent development. Nevertheless, there is considerable technical literature describing its characteristics and comparing them with other known methods of storing energy and with alternative peak shaving practices. It has heretofore been assumed that excess electricity would be produced during off-peak periods, when the base load plant has surplus capacity, and that this excess would be "stored" by converting it to potential energy in compressed air.

This is, however, an inefficient practice. Electricity generation has a typical fuel efficiency of only about 35 percent. Large rotary air compressors have an adiabatic efficiency of about 80 percent. Thus, less than 30 percent of the fuel energy is actually stored. There are further losses in converting the pressure energy back to electricity.

A number of pressurized combustion processes are in use or under development. A common characteristic is that expansion of flue gas furnishes the power to compress combustion air. Most frequently used for generating electricity are various gas turbine cycles. A method receiving considerable development effort is pressurized fluidized bed combustion (PFBC) which may generate base load electricity both through the production of high pressure steam and from surplus energy of expansion of its flue gas. Others are the supercritical wet combustions described in the parent case and U.S. Pat. No. 4,377,066.

With any of the pressurized base load combustions it is possible to bypass the inefficient intermediate of electricity for energy storage by designing the compressors which deliver combustion air to have excess capacity during off-peak periods, and to divert the excess to pressurized storage. This is most conveniently accomplished if combustion and storage pressures are approximately the same. But, even when storage pressure is appreciably higher, the excess may be stored with the aid of small booster compressors. During peaks, the stored air may be converted to peak load electricity in the conventional way, i.e., by heating it by direct firing of oil or gas and expansion through turbines driving the peaking generators. While feasible, this route suffers the disadvantage of requiring premium fuel.

I have discovered that compressed air so stored can be converted to electricity during peaks more efficiently, and generally without premium fuel, by using it as base load combustion air, replacing part or all of that normally supplied by the combustion air compressors. The turbines which normally drive these compressors then have excess mechanical energy to drive the peaking generators. Moreover, one set of compressors and turbines does the work for which two sets would otherwise have been required.

Commercially available gas turbine generators require premium gas or low sulfur oil fuel and are not, therefore, generally considered economical for producing base load electricity. Moreover, they usually compress air to only about 100 psi or less whereas storage caverns are expected to operate in a higher range of pressure.

PFBC's, on the other hand, are being developed to burn coal and other low cost solid fuels considered economical sources of base load energy. Various pressure levels have been tested or proposed, in some instances as high as 250 psi. The higher pressure PFBC's are potentially capable of forming an economical base load-peak load combination with CAES.

Among the specialized PFBC's particularly suitable for CAES combinations is the supercritical wet combustion process of U.S. Pat. No. 4,377,066 which produces a flue gas virtually free of sulfur and nitrogen oxides, erosive dust and salts liable to corrode or form deposits on gas turbine blades. Various embodiments of this process have operating pressures from 100 to 5000 psi. For a particular site and fuel supply it will frequently be possible to set combustion pressure near to cavern charging pressure.

It is convenient for a pressurized combustion, operated in combination with compressed air storage according to my invention, to have a pressure reasonably near to cavern charging pressure, as in the embodiment of FIG. 3, so that the same set of compressors can deliver air to both. However, this is not a requirement. Storage pressure may be sufficiently lower than combustion pressure to need fewer stages of compression, as in the embodiment of FIG. 1 or, conversely, sufficiently higher to need more stages, as in the embodiment of FIG. 2.

As would be expected, the size and duration of peak demand varies considerably from one utility system to another. The CAES facility at Huntorf was designed to meet a 2 hour peak load with a charging time of 8 hours. In other words, air is withdrawn from storage at 4 times the charging rate and the daily cycle provides 14 hours of standby time. The cancelled Illinois facility, on the other hand, was designed to meet an 11 hour peak load with a charging time of 11 hours. Charging and withdrawal rates were, therefore, to be equal and only 2 hours of standby time provided. Thus, although relying on similar operating principles, considerable differences in apparatus are entailed.

Combinations of pressurized combustion and CAES employing a single train of air compressors, as in the embodiments of FIGS. 1 and 2, depend entirely on stored air to meet base load combustion requirements during the peak period. In most cases this air supply is sufficient for short peaks but not for those of extended duration. For peaks longer than 2 or 3 hours, parallel compressor trains, as in the embodiment of FIG. 3, are preferable or necessary. In embodiments of the latter type, one compressor train remains in operation during the peak period, supplementing the flow of stored air. With a suitable division of capacity between trains, peaks of any reasonable duration may be satisfied.

In the drawings, turbines and compressors are shown, for clarity of illustration, to be connected in pairs and turbines, as well as compressors within a train, are arranged in series. Numerous alternative arrangements are possible. More than one stage of turbines may combine their power output in a common shaft, and more than one stage of compressors may receive power from a common shaft, in some cases through a gear box. The number of turbine and compressor stages may be different. For example, two turbine stages may power three compressor stages through a common shaft. In some instances, compressors arranged in series may be powered by turbines arranged in parallel.

Although the recovery of stored compressed air energy by utilizing it as base load combustion air is a novel and efficient concept, it is also possible to employ the combustion processes of the parent case and U.S. Pat. No. 4,377,066 to reheat stored air separately from base load apparatus. Compared to the known CAES practice such embodiments have the important advantage of utilizing low cost solid fuels rather than premium oil or gas.

For such purposes it is possible to use a fully developed wet combustion embodiment similar to those of FIG. 1 and FIG. 2 (except that expansion of clean, dry, reheated flue gas powers peaking generators exclusively). Combustion pressure would be slightly below storage cavern delivery pressure. Because dehydrated flue gas carries away little latent heat such an embodiment is very energy efficient.

Considering that peaking facilities are operated but a small fraction of total time, it is often worthwhile to minimize capital investment at the expense of energy efficiency. In some circumstances overall economy may best be served by utilizing a supercritical wet combustion, as in the embodiments of FIGS. 1 and 2, without the rather extensive investment in heat exchange apparatus necessary to cool the gas (to dehydrate it) and then reheat it before expansion. Instead, combustion products, after cooling only a little below their dewpoint (which is comparatively high), so ash may be separated as a slurry and the gaseous phase washed free of solids, still containing a substantial proportion of water vapor, would be expanded through turbines driving peaking generators. Preheat and/or interstage reheat would be used if economically justified. Although considerable latent heat would be lost in the turbine exhaust this loss would be partially offset by the added volume of the water vapor expanded with the flue gas.

If recovery of dry, rather than slurried, ash were preferred it would be feasible, with either a fully developed supercritical wet combustion or abbreviated, embodiment such as described in the preceding paragraph, to pass the uncooled combustion products through a gas-solids separating device, such as a cyclone separator. Such a separation is illustrated in FIG. 2 of the parent case.

As a further variation of the abbreviated combustion embodiment it is possible to expand hot combustion products through turbines driving peaking generators, after only thorough dry dust removal, according to the known art as, for example 3 stages of cyclone separators. In such cases, special turbines, resistant to erosion and deposits, would be specified.

The combustion and solids separation portions of these reduced investment embodiments are identical to the corresponding portions of embodiments of the parent case and U.S. Pat. No. 4,377,066 which produce clean or washed flue gas-steam mixtures for heating and pressuring underground formations to enhance oil recovery.

Although the CAES literature is confined to the storage of compressed air, and the illustrated embodiments of the subject invention also store compressed air, the parent case and U.S. Pat. No. 4,377,066 disclose the delivery of clean pressurized flue gas to underground formations as a driving force for enhanced oil recovery. Similarly, clean pressurized flue gas may be delivered to an underground cavern for energy storage, in a manner analogous to the known CAES. For example, flue gas leaving the tops of the flue gas dehydrators of FIG. 1 or FIG. 2 would be suitable for charging a storage cavern. Clean pressurized flue gas is a more efficient form of pressure energy than compressed air derived from it at the expense of turbine and compressor losses.

To recover the potential energy stored as compressed flue gas it needs only be reheated and expanded through turbines driving peaking generators. Since it will not support combustion it must be heated by transfer instead of direct firing. A number of such heating methods are available, including fired furnaces and transfer surface immersed in, or by direct contact with, a bed of hot fluidized solids. Although requiring a somewhat more complicated apparatus, indirect heating usually does not need premium fuels.

It is also within the scope of the invention to store a pressurized mixture of flue gas (as from the top of a flue gas dehydrator) and air (as from excess combustion air compressor capacity). Depending upon proportions, such a mixture may be suitable for direct fired reheating, as well as the indirect method mentioned above.

Having described my invention, I claim:

1. A combination of pressurized combustion and compressed air energy storage in which air is compressed to combustion pressure by means of a compression train comprising a plurality of stages, combustion heat is transferred at combustion pressure to boiling feedwater, cooled flue gas is reheated and expanded through turbines which drive the compressor stages, the compression train having capacity in excess of that required for combustion during off-peak periods, the excess compressed air during such periods being charged to a storage cavern.

2. A process as in claim 1 in which the compressed air charged to the storage cavern during off-peak periods is withdrawn from the storage cavern during peak periods and utilized as combustion air in the pressurized combustion.

3. A process as in claim 2 in which the air withdrawn during peak periods is recompressed to combustion pressure by the last stage of the compression train, earlier stages being disconnected from the turbines which drove them during off-peak periods, the power of the disconnected turbines being redirected to generators which the redirected power to peak load electricity.

4. A process as in claim 2 in which stages of the compression train, excepting the last stage, have excess capacity to charge the storage cavern and the air withdrawn during peak periods is compressed to combustion pressure by the last two stages of the train, earlier stages being disconnected from the turbines which drove them during off-peak periods, the power of the disconnected turbines being redirected to generators which convert the redirected power to peak load electricity.

5. A process as in claim 2 in which the air compressed to combustion pressure, which during off-peak periods is in excess of combustion requirements, is, further compressed by a booster compressor to a storage pressure higher than combustion pressure and, during peak periods, withdrawn from the storage cavern and utilized as combustion air, the compressors of the compression train and the booster compressor being disconnected from the turbines which drove them during off-peak periods, the power of the disconnected turbines being redirected to generators which convert the redirected power to peak load electricity.

6. A process as in claim 3 in which the stages of the compression train, excepting the last stage, are divided into parallel trains, the compressors of one of the parallel trains being disconnected, during peak periods, from the turbines which drove them during off-peak periods, the power of the disconnected turbines being redirected to generators which convert the redirected power to peak load electricity.

7. A process as in claim 4 in which the stages of the compression train, excepting the last two stages, are divided into parallel trains, the compressors of one of the parallel trains being disconnected, during peak periods, from the turbines which drove them during off-peak periods, the power of the disconnected turbines being redirected to generators which convert the redirected power to peak load electricity.

8. A process as in claim 5 in which the compression train is divided into parallel trains, the compressors of one of the parallel trains and the booster compressor from the turbines which drove them during off-peak periods being disconnected, during peak periods, the power of the disconnected turbines being redirected to generators which convert the redirected power to peak load electricity.

9. A combination of a pressurized combustion and compressed gas energy storage in which flue gas from the combustion is, during off-peak periods, cooled and cleaned under essentially combustion pressure and charged to a storage cavern from which, during peak periods, it is withdrawn, heated and expanded through turbines driving peak load generators.

10. A process as in claim 9 in which a mixture of the cooled and cleaned flue gas and air compressed by combustion air compressors, in excess of combustion requirements, is charged to the storage cavern from which, during peak periods, it is withdrawn, heated and expanded through turbines driving peak load generators.

11. An energy storage process in which compressed air is charged, during off-peak periods, to a storage cavern from which, during peak periods, it is withdrawn and utilized as combustion air in a pressurized combustion to which solid fuel is charged as an aqueous slurry containing alkali, in an amount at least the chemical equivalent of the sulfur in the fuel as alkali sulfate, combustion temperature is controlled below a maximum of 1600 degrees F. by the injection of water and combustion products, after separation therefrom of solid products by a gas-solids separating device, are expanded through turbines driving generators which produce peak load electricity.

12. A process as in claim 11 in which combustion products, after separation therefrom of solid products, are cooled below their dewpoint, forming an aqueous condensate containing solid products not separated by the gas-solids separating device and a purified flue gas-steam mixture which is expanded through turbines driving generators which produce peak load electricity.

* * * * *